United States Patent [19]

Kryger

[11] Patent Number: 4,547,384

[45] Date of Patent: Oct. 15, 1985

[54] METHOD FOR ASEPTIC ADDITION OF DIPEPTIDE OF L-PHENYLALANINE AND L-ASPARTIC ACID TO PASTEURIZED DRINKS AND JUICES AND THE PRODUCT RESULTING THEREFROM

[75] Inventor: Allen C. Kryger, Holland, Mich.

[73] Assignee: Squirt & Company, Holland, Mich.

[21] Appl. No.: 588,387

[22] Filed: Mar. 12, 1984

[51] Int. Cl.$^4$ .................. A23L 1/236; A23L 2/00; A23L 2/02

[52] U.S. Cl. .................. 426/548; 426/590; 426/599

[58] Field of Search ............ 426/590, 599, 548, 650, 426/490, 495, 521

[56] References Cited

U.S. PATENT DOCUMENTS

| | | | |
|---|---|---|---|
| 3,642,491 | 2/1972 | Schlatter | 426/590 |
| 3,860,729 | 1/1975 | Strandskov et al. | 426/599 |
| 4,079,151 | 3/1978 | Schade et al. | 426/548 |
| 4,143,170 | 3/1979 | Finucane et al. | 426/548 |
| 4,153,737 | 5/1979 | Berg et al. | 426/548 |
| 4,419,378 | 12/1983 | Rule | 426/330.3 |

FOREIGN PATENT DOCUMENTS 2103917 3/1983 United Kingdom.
2104369 3/1983 United Kingdom.

OTHER PUBLICATIONS

Weast, ed., *Handbook of Chemistry and Physics*, 53rd ed., CRC, Chemical Rubber Co., 1972, p. C-245.
"The NutraSweet TM Breakthrough", published by Searle Food Resources, Inc., a subsidiary of G. D. Searle & Co., ©1982.

*Primary Examiner*—Raymond Jones
*Assistant Examiner*—Elizabeth C. Weimar
*Attorney, Agent, or Firm*—Price, Heneveld, Huizenga & Cooper

[57] ABSTRACT

The specification discloses a process and resulting pasteurized drink or juice product based on dissolving the dipeptide of L-phenylalanine and L-aspartic acid in a solvent at approximately room temperature with an excess by weight of either malic acid, citric acid or mixtures thereof. The ratio of the acid to the dipeptide sweetener is at least about 1.5. This solution is then added to a previously pasteurized juice or drink which has cooled to about room temperature.

12 Claims, No Drawings

METHOD FOR ASEPTIC ADDITION OF DIPEPTIDE OF L-PHENYLALANINE AND L-ASPARTIC ACID TO PASTEURIZED DRINKS AND JUICES AND THE PRODUCT RESULTING THEREFROM

BACKGROUND OF THE INVENTION

The present invention relates to the use of Aspartame TM in an aseptically packaged fruit juices and fruit drinks. Aspartame TM is the trademark of an artificial sweetener comprising the dipeptide of the commercially produced amino acids, L-phenylalanine (as the methyl ester) and L-aspartic acid. It is about 200 times sweeter than sugar. Hence, relatively small quantities can be used to produce a sweet, good-tasting drink or juice which is very low in calories.

The problem with using Aspartame TM is aseptically packaged drinks is that the drink and all of its contents must be sterilized prior to packaging. Pasteurization is critical lest the drink ferment or otherwise deteriorate during shelf storage. Unlike soft drinks, aseptically packaged juices or fruit drinks do not have sufficient cabonation to assist in sterilization and do not contain preservatives. Hence, the aseptically packaged juice or fruit drink must be pasteurized prior to packaging.

Aspartame TM is very heat sensitive and tends to deteriorate during the juice pasteurization process. An Aspartame TM sweetened fruit juice or fruit drink which tastes sufficiently sweet prior to pasteurization loses its sweetness to a significant and noticable degree after pasteurization.

A similar phenonmenon occurs with respect to juice flavoring ingredients. Hence, prior artisans have heretofore added juice flavoring ingredients back into a pasteurized juice or juice drink after pasteurization, by passing the flavor ingredients through a purifying microfilter. One's initial thought is to do the same thing with Aspartame TM by dissolving it and passing the solution through a microfilter.

The problem with this approach is that Aspartame TM is not particularly soluble in conventional solvents. Its producer, G. D. Searle and Company, reports that it is approximately 1% soluble in water at room temperature and only 0.37% soluble in ethanol at room temperature.

G. D. Searle and Company does indicate in its literature concerning Aspartame TM that one can increase the solubility of Aspartame TM by lowering the pH of the solution with food acids, such as citric acid or malic acid. Even so, Searle reports that only about 9 grams of Aspartame TM are soluble in 100 milliliters of water at a pH of 2.2 at room temperature. Searle reports that a pH of 2.2 offers maximum solubility. Because of this low solubility, one tends to dilute the strength of one's fruit juice or drink by reason of the Aspartame TM addition. Also, the addition time is increased since more solution has to be added than would be the case if Aspartame TM were more soluble in water.

U.K. Pat. No. 2,103,917 published Mar. 2, 1983 to PepsiCo Inc. discloses that more concentrated Aspartame TM solutions can be obtained by lowering the pH of the solution to from about 1.5 to 2.2, preferably 1.7 to 2.0, with phosphoric acid. The problem with this approach is that with pHs below about 2.2, and especially below 2.0, you begin to hydrolyze and destroy the Aspartame TM.

The United Kingdom patent also suggests, without showing examples, that fumaric, malic and citric acids will also work. However, fumaric is highly insoluble and won't work in accordance with the examples shown in the patent. Malic and citric acids won't lower the pH much below about 2.2 and do not work when used in accordance with the examples of this patent.

I have invented a process for aseptically adding flavor ingredients to fruit juices and fruit drinks after pasteurization, without having to use a microfilter, by dissolving the flavor ingredient in a high percentage alcohol solution. Unfortunately, Aspartame TM is even less soluble in ethyl alcohol, as noted above, and pH adjustments are not particularly meaningful in alcohol solutions.

As a result, there are serious road blocks to the use of Aspartame TM in aseptically packaged drinks and juices. To my knowledge, Aspartame TM has not heretofore achieved commercial usage for this purpose.

SUMMARY OF THE INVENTION

In the present invention, the aseptic addition of the dipeptide of L-phenylalanine and L-aspartic acid to a previously pasteurized juice or drink is achieved at about room temperature by increasing to substantially beyond heretofore reported limits the quantity of the sweetener which is present in a given volume of diluent without running the risk of hydrolyzation with strong acids such as phosphoric acid. The word "substantially" as used in relation to "substantially exceeding" heretofore published Aspartame TM solubility levels at room temperature is intended to distinguish the kind of minor increases in solubility one might obtain by slight variations in "room temperature," experimental error variations in previously reported solubilities and increases in alcohol solubility due to water dilution of the alcohol, routine addition of citric acid to alcohol in accordance with prior art teachings and the like. This is accomplished by adding to the Aspartame TM, in the solvent, citric or malic acid in an amount at least about 1.5 times by weight of the amount by weight of the sweetener. Thus, the present invention focuses not on the pH of the solution per se but on the ratio of the malic or citric acid to the sweetener.

As a result, a substantially more concentrated solution of the sweetener can be added to the juice or drink after pasteurization. Yet, malic and citric acid don't lower the pH of the solution to much below about 2.2. These and other aspects, advantages and features of the invention will be more fully understood and appreciated by reference to the written specification.

DESCRIPTION OF THE PREFERRED EMBODIMENT

In the preferred embodiment, a solution of Aspartame TM is made by mixing the Aspartame TM in a solvent with at least about 1.5 times by weight of malic acid, or citric acid. This addition is done at approximately room temperature. This solution is then added to a drink or juice after it has been pasteurized and cooled to about room temperature. In one embodiment, the solvent used is water and the Aspartame TM solution is added through a microfilter to ensure aseptic addition. In another embodiment, the solvent used is aseptic-strength alcohol. The Aspartame TM solution can then be added directly to the juice or drink without filtration since the alcohol renders the Aspartame TM solution self-sterilizing.

The ratio of malic or citric acid to Aspartame TM is at least 1.5 by weight. Use of the work "about" allows for some minor variation of this lower limit. Thus, for example, good results have been achieved in this invention with a ratio of as low as 1.44 by weight citric acid to Aspartame TM. Of course, it is preferable for ease of solvation to use a higher weight ratio. It is preferable that the ratio by weight be at least about 1.8.

Most preferably, the weight ratio of acid to Aspartame TM is at least about 2. The ratio has to be higher at lower percentages of Aspartame TM. As the percentages of Aspartame TM increase, it has been surprisingly found that the quantity of acid required relative thereto tends to decrease.

Indeed if alcohol is the solvent, the quantity of acid required relative to Aspartame TM is somewhat higher. At least about 1.7 parts by weight acid to Aspartame TM is required in alcohol solutions.

When water is used as the solvent, one can dissolve in excess of 30 grams of Aspartame TM per 100 milliliters of water at room temperature. The advantage of utilizing water as the solvent in accordance with the present invention is of course that one can achieve a very high concentration of Aspartame TM in the Aspartame TM addition solution.

The advantage of using an aseptic strength alcohol as the solvent is that the resulting solution will be self-sterilizing. One can thus add the self-sterilizing Aspartame TM solution to the previously pasteurized drink or juice without having to pass the solution through a microfilter. The disadvantage to utilizing alcohol as the solvent is that one cannot dissolve as much Aspartame TM. Even so, it has been found that by practicing the method of the present invention, one can dissolve in excess of 11 grams of Aspartame TM in 100 grams of alcohol. This can be done utilizing about 20 grams of acid, thus yielding an 8% Aspartame TM solution in ethyl alcohol. The best previously reported results indicate that such an alcohol solution would be about 0.37%.

The preferred alcohol is ethanol. The results of the previous paragraph were achieved utilizing a 95% ethanol solution. Even a 70 to 75% ethanol solution is self-sterilizing, e.g., aseptic. The quantity of Aspartame TM added to 100 grams of ethanol in accordance with the method of the present invention has been found to be as high as 14 grams at room temperature, utilizing 24 grams of citric acid. This yields an Aspartame TM solution at a strength in excess of 10%.

Malic and citric acid can both be used without the danger of substantially hydrolyzing the Aspartame TM. They will lower the pH of the solution to about 2.2, perhaps as low as 2.0, but not lower. Stronger acids such as hydrochloric acid and phosphoric acid are not acceptable because of the hydrolysis risk. Fumaric acid is unacceptable because it is simply not sufficiently soluble in water or alcohol.

In laboratory quantities, the addition of Aspartame TM and acid was done step wise. The amount of mixing required during each addition step was only a few minutes. In mixing bulk quantities, considerably more addition time is required. For convenience, it is preferable to add the total quantity of Aspartame TM and acid desired and allow them to mix for several hours. I have found it most convenient to simply allow the solution to mix overnight. Of course, one has to be careful to avoid such vigorous mixing as to substantially elevate the temperature of the solution. The solution should at all times be kept at around room temperature, rather than at significantly elevated temperatures, in order to avoid heat degradation of the Aspartame TM.

There tends to be a slight exothermic effect as the Aspartame TM is dissolved. Hence, temperature tends to increase somewhat as dissolution proceeds. On laboratory scale, there tends to be about a 7° C. rise in temperature as the maximum quantity of Aspartame TM is dissolved. If one were seeking maximum dissolution of Aspartame TM on a commercial scale, one might find it necessary to take special steps to dissipate heat from the mixing equipment, as for example cooling coils or the like. However, for dissolving lesser quantities, as for example about half of the maximum potentially soluble Aspartame TM in five gallons of solution, it has been found that no special cooling precautions are required. Sufficient heat dissipates during mixing that any significant heat degradation of the Aspartame TM is avoided.

EXAMPLES

In the following Examples, incremental amounts of Aspartame TM were added to the solvent. These additions were followed by incremental additions of acid. In the Tables below, the impact of the cumulative ratio of acid to Aspartame TM (by weight) on solubility can be seen. Where an incremental addition of either acid or Aspartame TM does not completely dissolve all of the Aspartame TM present, no cumulative ratio is reported.

EXAMPLE I

In Example I, Aspartame TM was dissolved in 100 milliliters of water with the help of citric acid. Changes in temperature over the course of addition were measured and it can be seen that the temperature increased 6.8° C. over the course of the addition. It can be seen that the weight ratio of acid to Aspartame TM necessary to effect dissolution tends to decrease as the Aspartame TM reaches maximum solubility. In this Example, 33 grams of Aspartame TM were dissolved in 100 milliliters of water with the help of 47.55 grams of citric acid. The final ratio by weight of acid to Aspartame TM was about 1.44.

| g Asp. Added | Total Asp. | g Acid Added | Total Acid | Cum Ratio | Solubility Comment | Temp °C. |
|---|---|---|---|---|---|---|
| 5 | 5 | 9.66 | 9.66 | 1.93 | Dissolves | 21.6 |
| 5 | 10 | 11.16 | 20.82 | 1.87 | Dissolves | 20.8 |
| 5 | 15 | 8.88 | 29.70 | 1.98 | Dissolves | 21.2 |
| 3 | 18 | 3.25 | 32.95 | 1.83 | Slowly Dissolves | 22.9 |
|  |  | .66 | 33.61 |  | Dissolves |  |
| 2 | 20 | 2.09 | 35.70 | 1.78 | Dissolves | 24.2 |
| 2 | 22 | 2.18 | 37.88 | 1.72 | Dissolves | 25.2 |
| 2 | 24 | 2.04 | 39.92 | 1.66 | Dissolves | 26.8 |
| 3 | 27 | 1.83 | 41.75 | 1.55 | Dissolves | 28.8 |
| 3 | 30 | 3.45 | 45.20 | 1.51 | Dissolves | 28.4 |
| 3 | 33 | 2.35 | 47.55 | 1.44 | Dissolves | 28.4 |
|  |  |  |  |  | No more would dissolve |  |

EXAMPLE 2

In Example 2, the Aspartame TM was dissolved in 100 milliliters of water with the assistance of malic acid. there was about a 7° C. rise in temperature during the dissolution process. In all, 31 grams of Aspartame TM were dissolved in 100 milliliters of water using 51.10 grams of malic acid. The total ratio by weight of malic acid to Aspartame TM was about 1.65. As in Example 1, initially higher ratios were required to dissolve the Aspartame TM, i.e., in excess of 2.

| g Asp. Added | Total Asp. | g Acid Added | Total Acid | Cum Ratio | Solubility Comment | Temp °C. |
| --- | --- | --- | --- | --- | --- | --- |
| 5 | 5 | 10.93 | 10.93 | 2.19 | Dissolves | 19.5 |
| 5 | 10 | 12.77 | 23.70 | 2.37 | Dissolves | 18.4 |
| 5 | 15 | 11.10 | 34.80 | 2.32 | Dissolves | 19.9 |
| 5 | 20 | 5.75 | 40.55 | 2.03 | Dissolves | 22.6 |
| 1 | 21 | .45 | 41.00 | 1.95 | Dissolves | 25.2 |
| 2 | 23 | 3.00 | 44.00 | 1.91 | Dissolves | 26.0 |
| 2 | 25 | 2.90 | 45.90 | 1.84 | Dissolves | 26.0 |
| 2 | 27 | 2.10 | 48.00 | 1.78 | Dissolves | 26.1 |
| 2 | 29 | 1.47 | 49.47 | 1.70 | Dissolves | 26.8 |
| 2 | 31 | 1.63 | 51.10 | 1.65 | Dissolves | 26.8 |
|  |  |  |  |  | No more would dissolve |  |

EXAMPLE 3

In Example 3, Aspartame TM was dissolved in 50 grams of 95% ethanol using citric acid. A greater ratio of citric acid to Aspartame TM was required. In all, 5.5 grams of Aspartame TM were dissolved in 50 grams of 95% ethanol using 10 grams of citric acid. The ratio of acid to Aspartame TM required to effect early dissolution was in excess of about 2, but eventually the cumulative ratio was 1.8. The final solution, beyond which no more Aspartame TM would dissolve, was about 8.4% Aspartame TM solution.

| g Asp. Added | Total Asp. | g Acid Added | Total Acid | Cum Ratio | Solubility Comment |
| --- | --- | --- | --- | --- | --- |
| 3 | 3 | 6 | 6 |  | didn't all dissolve |
| — | 3 | 1 | 7 | 2.33 | dissolved |
| 1 | 4 | — | 7 | 1.75 | dissolved slowly- 20 minutes |
| 1 | 5 | — | 7 |  | not soluble |
| — | 5 | 1 | 8 | 1.60 | soluble |
| .5 | 5.5 | — | 8 |  | didn't all dissolve |
| — | 5.5 | .5 | 8.5 |  | didn't all dissolve |
| — | 5.5 | .5 | 9.0 |  | didn't all dissolve |
| — | 5.5 | 1.0 | 10.0 | 1.80 | dissolved |
|  |  |  |  |  | No more would dissolve |

EXAMPLE 4

In example 4, Aspartame TM was dissolved in 50 grams a 75% ethanol solution with the assistance of citric acid. The results parallel those for Example 3, but as might be expected in view of the additional water present, the Aspartame TM was somewhat more soluble. In all, 7 grams of Aspartame TM were dissolved in 50 grams of 75% ethanol solution with the assistance of 12 grams of citric acid. The final ratio by weight of acid to Aspartame TM was 1.71. This gave a 10.1% solution of Aspartame TM in 75% ethanol.

COMMERCIAL PROCEDURE

In commercial operations, one would first determine the percentage Aspartame TM solution to be added to the juice or drink. The necessary Aspartame TM and approximately twice as much citric or malic acid is then introduced into the desired solvent, either water or ethanol, in a batch mixer. These would be allowed to mix overnight in order to insure complete dissolution.

This solution could be added in bulk or in metered flow into a bulk quantity of already pasteurized juice or drink or into a stream of such juice or drink, respectively. In the case of introduction by metered flow, one would of course have to adjust the flow as a function of the strength of the Aspartame TM solution being added.

One is of course certain that the pasteurized juice or drink has been allowed to cool to about room temperature. In the case of addition of an alcohol solution, the Aspartame TM in alcohol solution can be added directly to the prepasteurized juice or drink. In the case of a water solution of Aspartame TM, it must first be filtered through a microfilter in order to remove impurities.

Of course it is understood that the above is a description of the preferred embodiment of the invention and that various changes and alterations can be made without departing from the spirit and broader aspects thereof.

The embodiments of the invention in which an exclusive property or privilege is claimed are defined as follows:

1. A method for aseptic addition of the sweetener comprising the dipeptide of L-phenylalanine and L-aspartic acid to pasteurized aseptic drinks and juices after pasteurization, said method comprising:

dissolving substantially in excess of 9 grams of said sweetener per 100 milliliters of water at approximately room temperature, by adding an excess by weight of malic acid, citric acid or mixtures thereof, the ratio of said acid to said sweetener being at least about 1.5 to 1 by weight;

followed by sterilizing and adding said solution to a previously pasteurized juice or drink which has cooled to about room temperature.

2. The method of claim 1 in which:

said ratio by weight of said acid to said sweetener is in excess of 1.7 to 1.

3. The method of claim 2 in which:

said ratio by weight of said acid to said sweetener is in excess of 2.0 to 1.

4. The method of claim 1 wherein said sterilizing comprises passing said solution through a microfilter.

5. An aqueous solution of sweetener comprising the dipeptide of L-phenylalanine and L-aspartic acid, for addition to pasteurized drinks and juices, said solution comprising:

substantially in excess of 9 grams of said sweetener per 100 milliliters of water, and malic acid, citric acid or mixtures thereof dissolved in said water wherein the ratio of said acid to said sweetener is at least about 1.5 to 1 by weight.

6. The solution of claim 5 wherein said ratio of said acid to said sweetener is in excess of about 1.7 to 1 by weight.

7. The solution of claim 5 wherein said ratio of said acid to said sweetener is in excess of about 2.0 to 1 by weight.

8. A method for aseptic addition of the sweetener comprising the dipeptide of L-phenylalanine and L-aspartic acid to pasteurized aseptic drinks and juices after pasteurization, said method comprising:

creating a self-sterilizing solution of said sweetener by dissolving substantially in excess of 0.37 grams of said sweetener in 100 grams of ethanol solution of at least aseptic strength at approximately room temperature, by adding an excess by weight of malic acid, citric acid or mixtures thereof, the ratio of said acid to said sweetener being at least about 1.7 to 1 by weight; followed by adding said selfsterilized solution to a previously pasteurized juice or drink which has cooled to about room temperature.

9. The method of claim 8 in which said sweetener solution is added directly to the previously pasteurized juice or drink without passing it through a microfilter.

10. The method of claim 8 in which:
said ratio by weight of said acid to said sweetener is in excess of 2.0 to 1.

11. A self-sterilizing solution of sweetener comprising the dipeptide of L-phenylalanine and L-aspartic acid, for addition to pasteurized drinks and juices, said solution comprising:
substantially in excess of 0.37 grams of said sweetener per 100 grams of an asepetic strength ethanol solution, and malic acid, citric acid or mixtures thereof dissolved in said solution wherein the ratio of said acid to said sweetener is at least about 1.7 to 1 by weight.

12. The solution of claim 11 wherein said ratio of said acid to said sweetener is in excess of about 2.0 to 1 by weight.

* * * * *

UNITED STATES PATENT AND TRADEMARK OFFICE
CERTIFICATE OF CORRECTION

PATENT NO. : 4,547,384
DATED     : October 15, 1985
INVENTOR(S) : Dr. Allen C. Kryger It is certified that error appears in the above-identified patent and that said Letters Patent is hereby corrected as shown below:

Column 1, line 19:

"is" should be --in--

Column 1, line 25:

"cabonation" should be --carbonation--

Column 3, line 2:

"work" should be --word--

Signed and Sealed this

Third Day of March, 1987

*Attest:*

DONALD J. QUIGG

*Attesting Officer*   *Commissioner of Patents and Trademarks*